United States Patent
Rochla

[15] 3,640,794
[45] Feb. 8, 1972

[54] APPARATUS FOR FORMING HEAT-SEALED END SEAMS IN TUBE SECTIONS OF PLASTICS MATERIAL

[72] Inventor: Kurt Rochla, Lengerich, Westphalia, Germany
[73] Assignee: Windmoller & Holscher, Westphalia, Germany
[22] Filed: Oct. 21, 1969
[21] Appl. No.: 871,212

Related U.S. Application Data

[62] Division of Ser. No. 646,384, June 15, 1967, Pat. No. 3,544,407.

[30] Foreign Application Priority Data

June 27, 1966 Germany..............................W 41 878

[52] U.S. Cl.............................................156/583, 156/272
[51] Int. Cl. ...............B32b 31/20, B30b 15/34, B29c 27/02
[58] Field of Search ..........................156/272, 274, 380, 583

[56] References Cited

UNITED STATES PATENTS 3,192,095   6/1965   Doyen et al........................156/583 X

*Primary Examiner*—Benjamin A. Borchelt
*Assistant Examiner*—J. J. Devitt
*Attorney*—Fleit, Gipple & Jacobson

[57] ABSTRACT

The open end of each tube section is continuously moved by retaining tools past a stationary source of radiant heat. The fused bead is then consolidated by the application of pressure. In this process, those end portions where the tube sections are to be closed by heat sealing are arranged one behind the other in planes which are at right angles to the direction of movement of said ends past the source of radiant heat. The tube sections are held in such a manner by the platelike holding tools that said end portions protrude from the holding tools toward the source of radiant heat. The tube sections are subsequently pulled to move the fused bead between the holding plates, which are slightly spaced apart. The holding plates are then pressed against the heat-sealed seams to consolidate the same.

7 Claims, 5 Drawing Figures

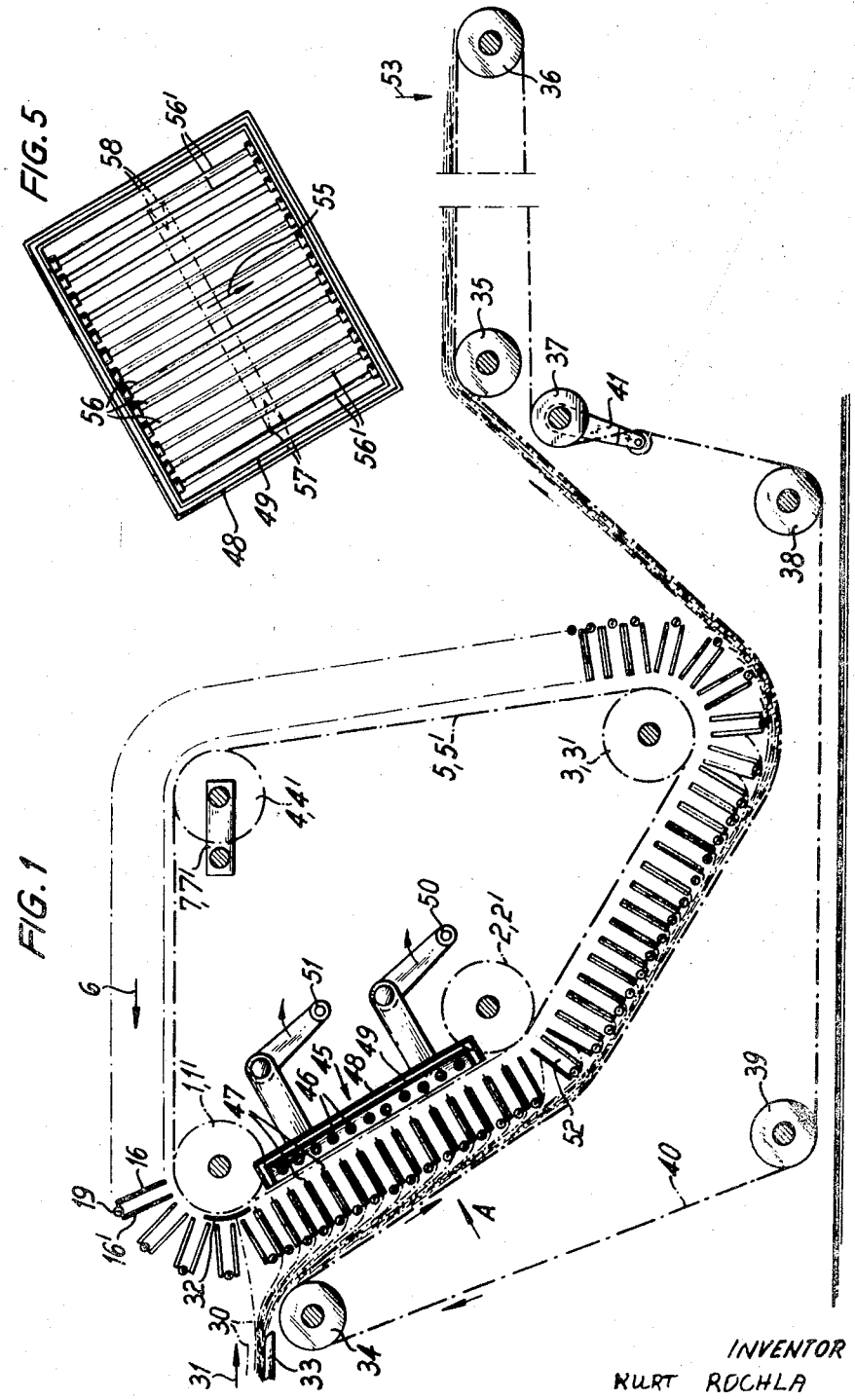

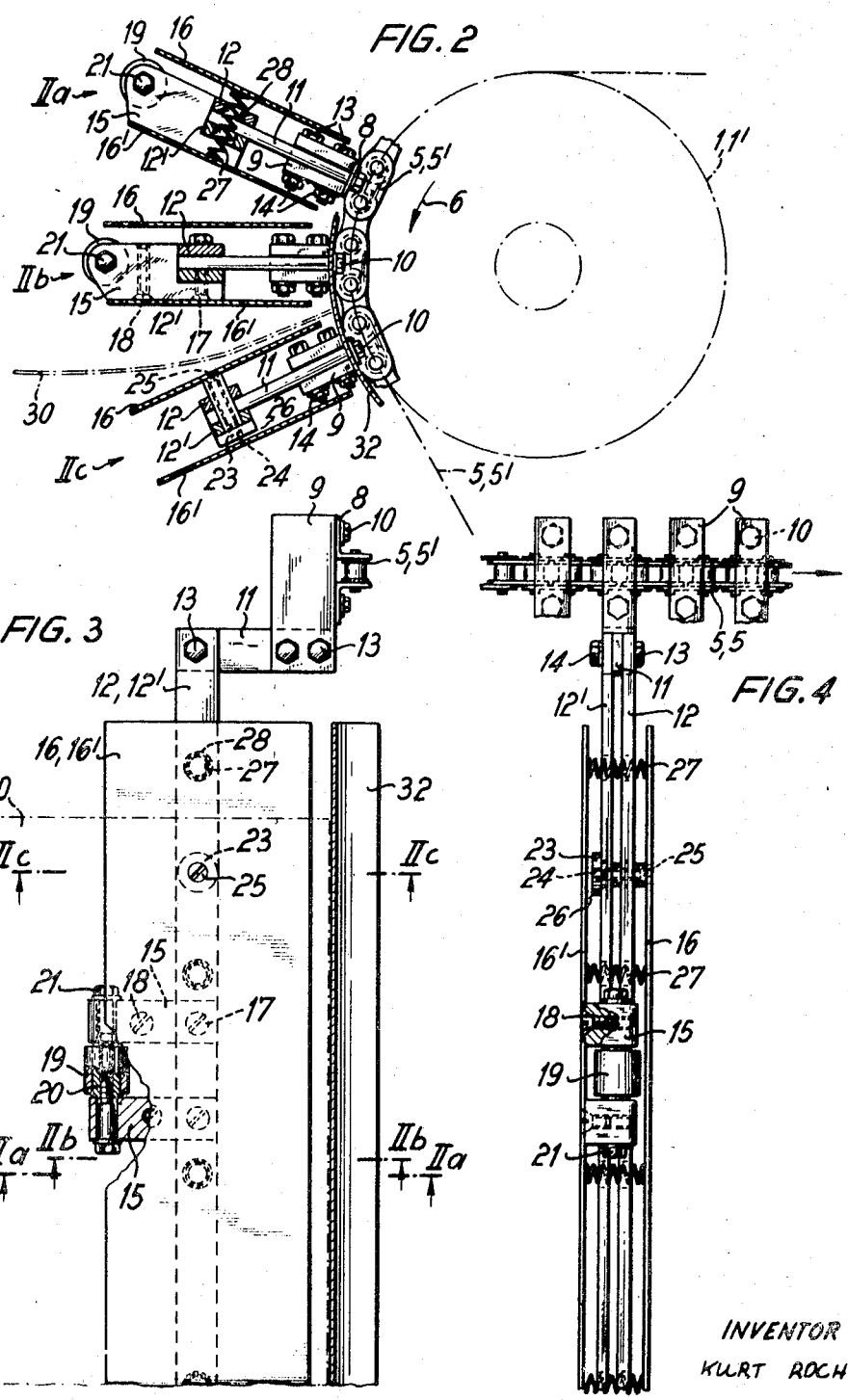

APPARATUS FOR FORMING HEAT-SEALED END SEAMS IN TUBE SECTIONS OF PLASTICS MATERIAL

This application is a division of Ser. No. 646,384, filed June 15, 1967, now U.S. Pat. No. 3,544,407, issued Dec. 1, 1970.

This invention relates to an apparatus and a process for forming heat-sealed end seams in tube sections of plastics material, which have an open end that is continuously moved by retaining tools past a stationary source of radiant heat, whereafter the fused bead is consolidated by the application of pressure. In this way, bags of plastics material are manufactured which are open at one end and serve for packaging bulk commodities of all kinds. When the commodity has been filled into the bag, the open filling end is also closed by heat sealing. The sections which have been severed from endless tubing may have two plies throughout or may be formed with so-called side gussets because it is a special advantage to the heat-sealed end seam that changes in the number of plies along the length of the seam, e.g., in bags having side gussets, do not adversely affect the quality of the seam, in contrast to seams produced by a simultaneous application of heat and pressure.

It is known to move tube sections to be closed by this method past the radiators at a suitable distance therefrom and in the longitudinal direction of the edges to be heat-sealed, i.e., in the plane of the tube sections transversely to the longitudinal direction thereof in a so-called transverse conveyance. The heat sealing travel is then equal to the produce of the heat sealing time and the speed of travel, e.g., the product of a heat sealing time of 10 seconds times a feeding speed of 0.4 meters per second or 4 meters. If one workpiece width is fed per 0.6 meter of the path of travel, the output will be $$(0.4/0.6) \times 60 = 40 \text{ bags}$$

per minute.

This known method has the disadvantage that a large working length is required and yet the output is relatively small. The output can be increased only by an increase in the working length because he heat sealing time depends on the properties of the material. Another important disadvantage of the known method resides in that the tube sections to be heat-sealed, if they are severed from an endless tubing, will move in the direction of travel of that continuous tubing and their direction of movement must be changed by 90° before the end edge can be heat-sealed. Before and after being severed, the tube sections move in the direction of their longitudinal axis. During the heat sealing of their end edges, however, they must be moved in the direction of said end edges, transversely to their longitudinal direction, in a so-called transverse conveyance.

In a known machine, this change in the direction of travel is effected in that the workpieces are arrested for a short time at the end of the path of longitudinal travel and transferred into a second path of travel, which is at right angles to the first. For this purpose, two machine sections extending at right angles to each other are required. Such arrangement requires a very large space in a manufacturing plant and involves long walking distances around the machine.

During a travel in the longitudinal direction of the heat-sealed seam, the seam can suitably be pressed only by pressure rollers, which apply pressure substantially at a point in a progressive operation. This results in an upsetting of waves, which are formed in some plastics materials under the action of heat. Such upset waves lead to trouble in operation or holes in workpieces so that the latter must be rejected.

Known apparatus for closing tube sections of plastics material by heat sealing comprises a rotatable paddle wheel, which is disposed between conveyors for supplying and removing the tube sections. That paddle wheel has radially open compartments, each of which receives a tube section during the rotation of the wheel and feeds that tube section to the point where the same is delivered to the removing conveyor. Close to those ends of the compartments which are near the axis of rotation, heat sealing devices are provided which act to form the heat-sealed seams during the rotation of the paddle wheel. In this apparatus, the edge where the tube section is to be closed by heat sealing extends transversely to the direction in which it is moved past a radiant heater. Said known apparatus has not proved satisfactory because it is highly expensive and the output of the machine is limited by the fact that the working distance is restricted to an arc of 180°.

It is an object of the invention to eliminate the above-mentioned disadvantages of the known heat sealing processes for forming end seams by reducing the working distance so as to save space, further, by reducing the expenditure of the machine and with it the coast of the products, and to increase the output so as to effect a further reduction of the costs of manufacturing open bags of plastics material. It is also desired to enable a manufacture which does not require a change in the direction of travel of the workpieces in the a horizontal plane so that the manufacturing process can be performed on a machine which except for its height extends only in one direction and enables a good utilization of space and can easily be operated. Other objects are to avoid an upsetting of waves, to improve the sequence of manufacturing operations, to enhance the quality of the products and to reduce the number of rejects.

In a process of the type mentioned first hereinbefore, this is accomplished in that those end portions where the tube sections are to be closed by heat sealing are arranged one behind the other in planes which are at right angles to the direction of movement of said ends past the source of radiant heat and the tube sections are held in such a manner by the platelike holding tools that said end portions protrude from the holding tools toward the source of radiant heat, the tube sections are subsequently pulled to move fused bead between the holding plates, which are slightly spaced apart, and the holding plates are then pressed against the heat-sealed seams to consolidate the same.

In this operation, the workpieces may succeed each other with a spacing of a few centimeters so that a low speed of travel results even when the output is high. This low speed of travel has a beneficial effect on the length of the heat sealing travel. For instance, if the distance between workpieces is 4 centimeters and the output is 120 bags per minute, the heat sealing travel will be only $0.04 \times (120/60) \times 10 = 0.8$ meter. As the workpieces are moved along a straight line or along a substantially straight line past the source of radiant heat, the length of the heat sealing travel and the speed of travel may be selected as required for an optimum performance of the manufacturing machine.

As the workpieces are moved at right angles to their own plane and at right angles to the longitudinal direction of the heat-sealed seam to be formed, pressure may be applied throughout the length of the seam at the same time so that no waves will be upset but any waves which may form will be flattened. It is a special advantage of the process according to the invention that the holding tools are used for applying pressure when the fused bead has been formed.

To carry out the process which has been described, the invention provides also apparatus which is essentially characterized in that holding plate means are attached to the links of revolving endless chains in such a manner that the holding plate means extend at right angles to the direction of movement of the chains and contact each other in the straight portions of the chains whereas the holding plate means are spread apart at means for deflecting the chains. An inlet and a stationary stop for the tube sections, which are longer than the plate means, are provided at first deflecting means, the source of radiant heat succeeds the first deflecting means and is succeeded by second deflecting means for deflecting the chains to a small extent. Also, a third deflecting means for a great change of the direction of movement of the chains are spaced from the second deflecting means, and at least one conveyor belt for moving the free portions of the tube sections and for urging them against the free end faces of the plates extends at a small distance from the free end faces of the plates and is driven at the same speed as the endless chains which carry the plate means. The spreading apart of the plate means at the deflecting means and the cooperation of the plate means with the conveyor belt ensure that all relative movements required between the tube sections and the plate means are accomplished in an extremely simple manner because the entrance and delivery of the tube sections are enabled by the substantial spreading of the plate means whereas the slight deflection causes the free end faces of the plate means to lead the conveyor belt, which retains the free portions of the tube sections, so that those edges of the tube section which are formed with the fused beads are drawn between the plate elements, which are subsequently spressed against each other again.

In a development of the invention, each plate element consists of two plates, which are secured to the chains by a common carrier and are free to move toward each other to a limited extent against spring force. This enables the plate means to be yieldably forced against the workpiece so that tube sections within a wide range of thicknesses can be processed in the machine.

It will also be desirable if freely rotatably mounted rollers or the like are provided at the free end faces of the plate means and protrude beyond the same so that the plate means move with rolling friction on the workpiece at the deflecting means whereas the rear portion of the latter is held between the conveyor belt and the plate means.

The invention will be explained more fully in the following description with reference to the drawings, which show by way of example an embodiment of the apparatus according to the invention. In the drawings:

FIG. 1 is a diagrammatic side elevation showing apparatus according to the invention for carrying out the process according to the invention for heat-sealing tube sections of plastics material at one end, FIG. 2 is an enlarged view showing a detail of FIG. 1 partly in sections taken on lines A–B, C–D and E–F in FIG. 3, FIG. 3 a top plan view associated with FIG. 2 and showing only one half of the symmetrical apparatus, FIG. 4 a side elevation associated with FIG. 3, and FIG. 5 an elevation showing a heating device in a different embodiment viewed in the direction of the arrow A in FIG. 1.

Two endless chains 5, 5' are arranged one behind the other when viewed in side elevation as in FIG. 1 and extend around sprockets 1, 1', 2, 2', 3, 3' and 4, 4'. The chains 5, 5' are driven in the direction of the arrow 6, e.g., by the sprockets 3, 3'. The sprockets 4, 4' are mounted in levers 7, 7' and serve for tensioning the chains. As is shown in FIGS. 2 to 4, the chains carry angle lugs 8, which have blocks 9 secured to them by screws 10. The blocks 9 are extended towards the middle of the machine. Each block 9 has a central aperture for receiving a plate 11. Two mutually opposite plates 11 carried by the two chains are provided with two flat bars 12, 12'. The plates 11 are connected to the blocks 9 and the flat bars 12, 12' are connected to the plates 11 by means of through bolts 13 and nuts 14. As is particularly apparent from the section C–D in FIG. 2, blocks 15 together with a lower plate 16' are secured with countersunk screws 17 to the flat bars 12'. A second countersunk screw 18 connects the plate 16' to four blocks 15. Each pair of blocks 15 form a bearing support for rollers 19. Each roller 19 is rotatable on a tapped bushing 20, which is secured by screws 21 between two blocks 15. The rollers 19 protrude over the forward edge 22 of the plate 16'. As is shown in the section E–F of FIG. 2, flanged sleeves 23 extend through aligned bores in the flat bars 12, 12'. Each of the flanged sleeves 23 is provided with a tapped through hole 24, into which a countersunk screw 25 is screwed, which connects a second plate 16 to the shank of the flanged sleeves 23. Each plate 16 is held by two such flanged sleeves 23 against transverse displacement and is movable in the longitudinal direction of the sleeve to an extent which depends on the clearance 26 between the flange of the sleeve and the lower plate 16'. The plates 16 and the flanged sleeves 23 are held in the illustrated position by springs 27, which extend through additional aligned bores 28 in the flat bars 12, 12' as shown in section A–B in FIG. 2. The springs 27 bear on the fixed plate 16' and urge the upper plate 16 upwardly until the flange of the flanged sleeve 23 engages the lower flat bar 12'.

The two plates 16 and 16' of a pair are spaced so that in the straight portions of the chains 5, 5' the adjacent plates 16' and 16 of two pairs of plates resiliently engage each other under the pressure which is required. In arcuate portions of the chains, the adjacent plates of two pairs thereof extend radially outwardly and are spaced apart so that the tube sections 30 can be moved between the adjacent plates, e.g., adjacent to the sprockets 1, 1'. From a transverse severing device, not shown, the tube sections 30, are supplied by longitudinal conveyance in the direction of the arrow 31 in FIG. 1. Each of said tube sections is fed between two pairs of plates into engagement with a stationary stop 32, which is concentric with the sprockets 1, 1' and at the desired distance behind the pairs of plates and adjacent thereto (FIG. 3). Upon engagement with the stop 32, the tube section 30 is arrested and drops on a table 33 or on the preceding workpieces which lie already on said table. In this manner, the way is cleared for the nest tube section. As soon as the chains leave the sprockets 1, 1' and enter a straight portion, the pairs of plates 16, 16' are closed to grip the workpieces under yielding pressure and to advance the workpieces. A series of belts 40 lie one beside the other and extend around pulleys 34 to 39. The belts 40 are tensioned by the pulleys 37, mounted in levers 41, and are driven by the pulley 36. The pulley 36 is positively driven from the means for driving the sprockets 3, 3' so that the belts 40 have the same speed of travel as the chains 5, 5'. The belts are uniformly spaced throughout the working width and surround the pairs of plates 16, 16' on their path from the sprockets 1, 1' to the sprockets 3, 3'. Adjacent to the sprockets 34, the belts are at a larger distance from the pairs of plates to define an entrance gap, which receives the ends of the shingled workpieces that are withdrawn from the table 33.

Behind the pair of plates, a heating device 45 is disposed between the pairs of sprockets 1, 1' and 2, 2' and is provided with radiators 46, which extend transversely to the direction of travel. The heating device 45 operates to fuse the workpiece end portions 47 protruding from the pairs of plates so that the known fused bead is formed. To shield the remaining machine, the radiators 46 are accommodated in a double-walled box 48, 49, which is pivotally movable about two pivots 50, 51 when the machine is stopped so that an excessive heating of the workpieces and plates is prevented.

The chains are slightly deflected at the sprockets 2, 2' so that the pairs of plates 16, 16' are slightly opened here. As the rear ends of the workpieces are held between the belts 40 and the pairs of plates 16, 16', particularly the rollers 19 on said plates, a workpiece will not follow the leading pivotal movement which is imparted to the pair of plates 52 by the deflection so that the forward workpiece end portion previously gripped by the pairs of plates lags behind and its fused bead enters between the following pairs of plates, which are then closed. The fused bead, which is still pasty, is thus compressed and cooled. In this position the workpieces and the pairs of plates move as far as to the sprockets 3, 3', where the chains are deflected until the pairs of plates have fully cleared the workpieces, which remain on the conveyor belts, by which they are moved to the delivery point 53.

FIG. 5 is an elevation showing the double-walled heating box 48, 49 with radiators 56 extending in the direction of travel of the workpieces. This direction is indicated by the arrow 55. For the sake of clearness, the cross section of a side-gusseted tube section which is to be heat-sealed is shown in dash-and-dot lines. The fact that the radiators extend in the direction of travel affords the advantage that the radiators 56' adjacent to the side gussets 57 and 58 may be designed for a higher heat output than the radiators to meet the higher heat requirement which is due to the side gussets. This arrangement of the radiators enables also an adaptation to tubes of different widths because the the outer radiators may be deenergized. If the higher heat output of the radiators for heat sealing the side gussets is due to a higher temperature of said radiators, a circuit may be provided which enables an individual temperature control of each radiator so that all radiators may be adjusted for the heat sealing of side gussets when this is desired.

With radiators 46 as shown in FIG. 1, which extend transversely to the direction of travel, the higher heat requirement for heat sealing side gussets may be met by designing the radiators for a higher heat output at the end portions opposite to the side gussets.

As the plates 16, 16' compress the entire fused end seam at the same time, the resulting waves will be flattened rather than upset.

The workpieces move through the apparatus along a straight line when viewed from above so that the machine has a normal, nonangular configuration, which ensures a good utilization of plant space and ease of operation.

What is claimed is:

1. Apparatus for forming heat-sealed end seams in tube sections of plastic material, and comprising: means for continuously moving open ends of said tube sections along a predetermined path of travel, said means of moving the open ends comprising at least one endless chain fed over at least three deflecting means; a stationary source of radiant heat located adjacent a portion of said path of travel, a plurality of holding plate means attached to said at least one chain such that said holding plate means extend substantially at right angles to said path of travel, contact each other in the portions of said at least one chain extending between said deflecting means, and are spread apart at said deflecting means; the first one of said deflecting means being arranged upstream of said stationary source of radiant heat and including a stationary stop means for said tube sections; the second one of said deflecting means being arranged downstream of said stationary source of radiant heat so as to deflect said at least one chain for a small extent so that the ends of the tube sections are drawn between adjacent holding plate means; the third one of said deflecting means being spaced from the second one of said deflecting means downstream thereof and arranged so as to deflect said chains for a large extent, so that the ends of the tube sections are drawn from between said adjacent holding plate means; and at least one conveyor belt extending at a small distance from the free end faces of said holding plate means, adapted to be driven at the same speed as said at least one chain, and serving to urge the free portions of said tube section against the free end faces of said holding plate means.

2. Apparatus according to claim 1, characterized in that each of said holding plate means consists of two plates secured to said at least one chain by a common carrier and free to move toward each other to a limited extent against spring force.

3. Apparatus according to claim 1, characterized in that freely rotatably mounted rollers or the like are provided at the free end faces of said holding plate means and protrude beyond the same.

4. Apparatus according to claim 1, characterized in that said source of radiant heat consists of a heating box containing radiators extending in the direction of travel of said tube sections, for use with tube sections and wherein having side gussets, the radiators located adjacent the side gussets are capable of producing more power than the other radiators.

5. Apparatus according to claim 4, wherein said radiators are arranged for individual energization and temperature control.

6. Apparatus according to claim 1, and comprising two chains.

7. Apparatus according to claim 1, characterized in that said source of radiant heat consists of a heating box containing radiators extending transversely to the direction of travel of said tube sections, and wherein for use with tube sections having side gussets, the end portions of the radiators adjacent to the side gussets are designed for a higher heat output than the intermediate portions.

* * * * *